US012036179B2

(12) United States Patent
Lin et al.

(10) Patent No.: US 12,036,179 B2

(45) Date of Patent: Jul. 16, 2024

(54) HANDHELD SYSTEM OF AUTOMATIC ACUPOINT STIMULATION

(71) Applicant: FENG CHIA UNIVERSITY, Taichung (TW)

(72) Inventors: Yu-Chen Lin, Taichung (TW); Jui-Yu Chen, Taichung (TW); Shuan-You Lin, Taichung (TW); Ching-Kun Chen, Taichung (TW)

(73) Assignee: FENG CHIA UNIVERSITY, Taichung (TW)

( * ) Notice: Subject to any disclaimer, the term of this patent is extended or adjusted under 35 U.S.C. 154(b) by 894 days.

(21) Appl. No.: 17/112,429

(22) Filed: Dec. 4, 2020

(65) Prior Publication Data

US 2022/0175615 A1 Jun. 9, 2022

(51) Int. Cl.

*A61H 39/00* (2006.01)
*A61H 39/02* (2006.01)
*A61H 39/04* (2006.01)

(52) U.S. Cl.

CPC ........... *A61H 39/007* (2013.01); *A61H 39/02* (2013.01); *A61H 39/04* (2013.01); *A61H 2201/0188* (2013.01); *A61H 2201/0196* (2013.01); *A61H 2201/1659* (2013.01); *A61H 2230/62* (2013.01)

(58) Field of Classification Search

CPC ...... A61H 39/00; A61H 39/007; A61H 39/02; A61H 39/04; A61H 39/06; A61H 39/08; A61H 2201/0188; A61H 2201/0192; A61H 2201/0196; A61H 2201/1659; A61H 2230/62

See application file for complete search history.

(56) References Cited

U.S. PATENT DOCUMENTS

2008/0312718 A1* 12/2008 Kulkarni ................ A61H 39/02
607/59

FOREIGN PATENT DOCUMENTS

| | | | |
|---|---|---|---|
| AT | 521300 | A1 | 12/2019 |
| CN | 101340880 | A | 1/2009 |
| CN | 203154280 | U | 8/2013 |
| CN | 205707401 | U | 11/2016 |
| CN | 107741748 | A | 2/2018 |
| CN | 107898626 | A | 4/2018 |
| CN | 109875875 | A | 6/2019 |
| TW | M258733 | U | 3/2005 |
| TW | M414229 | U | 10/2011 |

(Continued)

*Primary Examiner* — Todd J Scherbel

(74) *Attorney, Agent, or Firm* — RABIN & BERDO, P.C.

(57) ABSTRACT

A handheld system of automatic acupoint stimulation has a case, a camera unit, a storage unit, a human-machine-interface (HMI) unit, a processing unit, an acupoint recognizing unit, and an acupoint stimulating unit. The case has an accommodating space and a handle portion. The camera unit is to capture an image from a body part of a user. The storage unit is to store multiple predetermined acupoint data. The HMI unit is to receive an input signal. The processing unit searches for at least one predetermined acupoint datum that is corresponding to the input signal. The acupoint recognizing unit is to receive the at least one predetermined acupoint datum and obtain a reference length and a beginning basis to locate the acupoint. The acupoint stimulating unit is to stimulate the acupoint of the user located by the acupoint recognizing unit.

14 Claims, 7 Drawing Sheets

(56) References Cited

FOREIGN PATENT DOCUMENTS

| | | | |
|---|---|---|---|
| TW | M424147 | U | 3/2012 |
| TW | 201247191 | A | 12/2012 |
| TW | 201609077 | A | 3/2016 |
| TW | I661821 | B | 6/2019 |

* cited by examiner

HANDHELD SYSTEM OF AUTOMATIC ACUPOINT STIMULATION

BACKGROUND OF THE INVENTION

1. Field of the Invention

The present invention relates generally to a handheld system, and more particularly to a handheld system of automatic acupoint stimulation.

2. Description of Related Art

Conventional techniques to stimulate the human body's acupoints include acupuncture treatment (acupuncture and moxibustion) and simpler treatments such as massage treatment and electrical stimulation treatment. The acupuncture treatment is to stimulate a human body's acupoints to harmonize the human body's meridians, for the purposes of health care and symptom treatments. Besides, acupuncture may harmonize the human body's vitality, relieve the human body's meridians to improve the blood circulation, and promote a healthy body. According to researches, the acupuncture treatment apparently alleviates the symptoms of human body's nervous system, skeleton and muscle system, and functional disorders (such as stroke, after effects of spinal cord injuries, sports injuries, pains, abnormal gastrointestinal motility, abnormal peripheral circulation, primary dysmenorrhea, migraine, and so on). With the development of the modern medical technology, the use of the acupuncture treatment is more comprehensive. The acupuncture treatment not only alleviates the symptoms, but also improves the body constitution. Therefore, the acupuncture treatment has progressively become a daily health care.

However, the conventional acupoint-stimulating treatment has two major disadvantages. Firstly, the curative effect of the acupuncture treatment results from the accuracy of the acupoint position recognition. Most of the ordinary people do not have the ability to recognize the positions of the acupoints. Even if one ordinary, non-professional person has the ability, the accuracy of the ordinary person should be lower than that of a professional person skilled in the acupoint-stimulating treatment. Hence, a proper acupoint-stimulating treatment should be performed by a professional person. The patient must personally go to the medical institution (such as the hospital or the clinic) for meeting with and recognized by the professional person. The patient spends and wastes a lot of time travelling to and from the medical institution. It is much inconvenient for the elderly people or people with disabilities to leave home and go to the medical institution.

Secondly, in the related art, a conventional acupuncture robot may recognize a user's acupoint positions and insert acupuncture needles into the acupoints via a mechanical arm, such that the user would not have to find the professional person to stimulate the acupoints. However, the conventional acupuncture robot is a fixed machine that has to be installed on a fixed support (such as a table or a chair). The user has to reach the fixed support to be treated by the conventional acupuncture robot. As a result, the rotation and movement angle of the mechanical arm is limited, and it is not easy for the conventional acupuncture robot to insert the acupuncture needles into some specific acupoints (such as the acupoint at legs). Therefore, the conventional acupuncture robot has a limitation of difficulty with inserting the acupuncture needles into some specific acupoints.

In addition, in the use of the conventional acupuncture robot, the user may carelessly move or shift the conventional acupuncture robot, such that the recognition accuracy becomes lower. Hence, there should be a professional person to assist the user to operate the conventional acupuncture robot. Besides, the conventional acupuncture robot must be installed on the fixed support and is not easy to be moved. In practice, the conventional acupuncture robot is installed at the medical institution (such as the hospital or the clinic) and only operable by the related professional people. Consequently, the user who needs the acupoint-stimulating treatment still has to go to the medical institution having the conventional acupuncture robot in person. The use of the conventional acupuncture robot is limited and inconvenient.

SUMMARY OF THE INVENTION

An objective of the present invention is to provide a handheld system of automatic acupoint stimulation. The handheld system of the present invention may automatically recognize and stimulate the user's acupoints. The use of the handheld system of the present invention to stimulate the acupoints is more convenient.

The handheld system of automatic acupoint stimulation of the present invention comprises a case, a camera unit, a storage unit, a human-machine-interface (HMI) unit, a processing unit, an acupoint recognizing unit, and an acupoint stimulating unit.

The case has an accommodating space and a handle portion. The accommodating space is formed in an interior of the case. The camera unit is mounted in the accommodating space of the case to capture an image from a body part of a user. The storage unit is mounted in the accommodating space of the case to store multiple predetermined acupoint data. The HMI unit is mounted in the accommodating space of the case, is electrically connected to the storage unit, and is to receive an input signal. The processing unit is mounted in the accommodating space of the case, is electrically connected to the camera unit and the HMI unit, receives the input signal transmitted by the HMI unit, and searches for at least one predetermined acupoint datum that is corresponding to the input signal from the multiple predetermined acupoint data. The acupoint recognizing unit is mounted in the accommodating space of the case and electrically connected to the processing unit to receive the at least one predetermined acupoint datum and obtain a reference length and a beginning basis according to the image captured by the camera unit, wherein the acupoint recognizing unit adds the reference length(s) from the beginning basis to recognize and locate a position of an acupoint of the user. The acupoint stimulating unit is mounted in the accommodating space of the case and electrically connected to the acupoint recognizing unit to stimulate the acupoint of the user located by the acupoint recognizing unit.

The handheld system of the present invention may receive a symptom information inputted by the user and search for the acupoints that can alleviate the symptom, or receive an acupoint information inputted by the user. Then, the handheld system of the present invention may locate an accurate position of said acupoints on the user's body, thereby stimulating said acupoints of the user. The user may operate the handheld system of the present invention at home or any place to perform the acupoint stimulation depending on the user's symptoms. The position of the user's acupoints located by the handheld system of the present invention is more accurate. The use of the handheld system of the present invention is more convenient.

DETAILED DESCRIPTION OF PREFERRED EMBODIMENT(S)

Detailed embodiments and drawings of the present invention are provided as follows for the purpose that the technical features and effects of the present invention can be understood and implemented.

Figure 1:
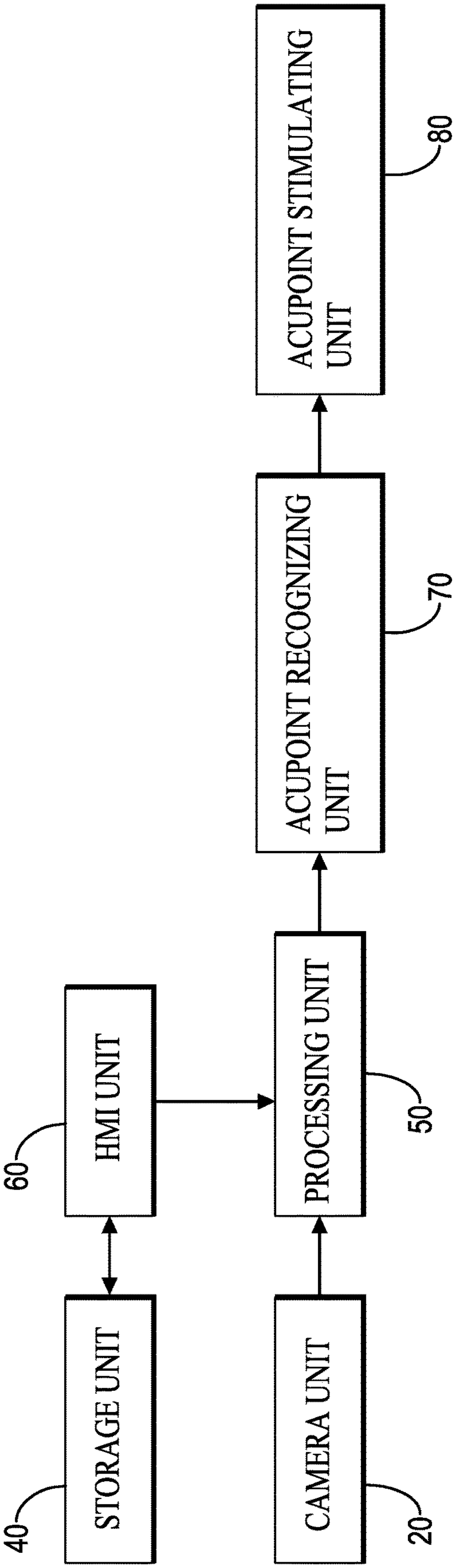
FIG. 1 is a block diagram of a first embodiment of the present invention.
Figure 2:
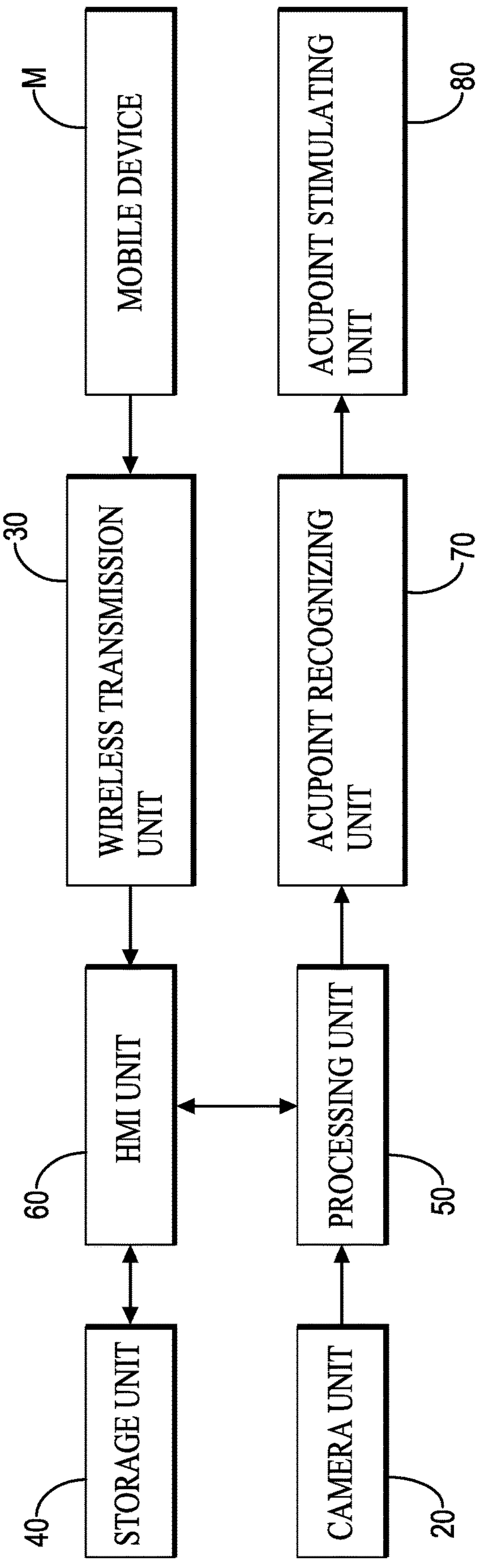
FIG. 2 is a block diagram of a second embodiment of the present invention.
Figure 3:
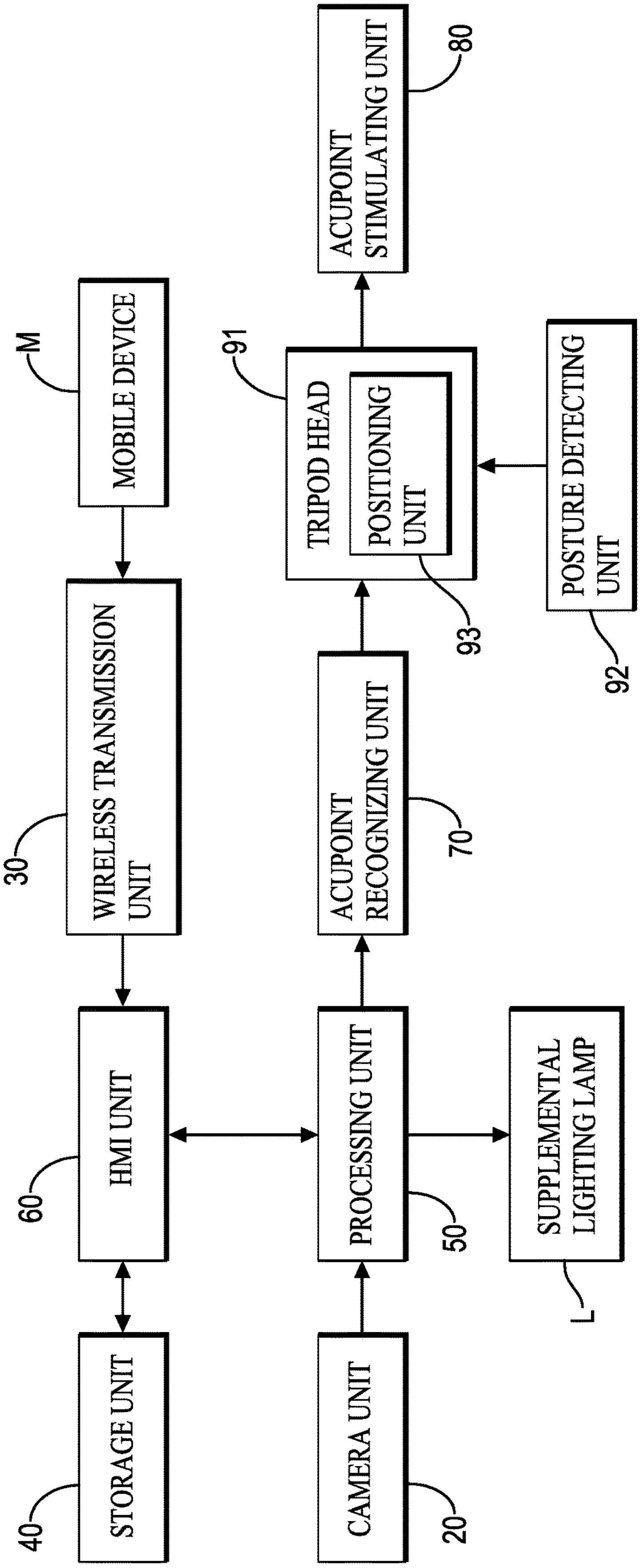
FIG. 3 is a block diagram of a third embodiment of the present invention.
Figure 5:
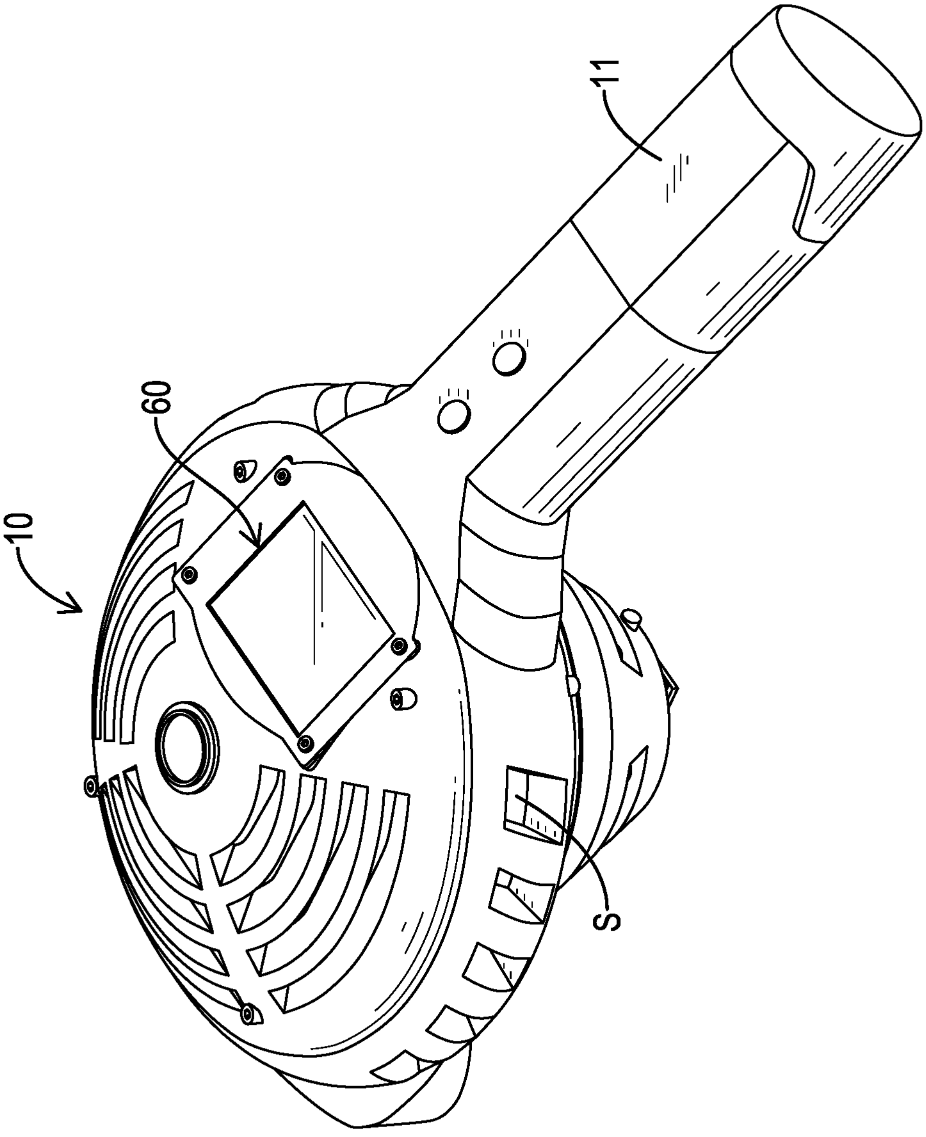
FIG. 5 is a perspective view of an embodiment of the present invention.

With reference to FIG. 1 and FIG. 5, the present invention provides a handheld system of automatic acupoint stimulation. In a first embodiment of the present invention, the handheld system comprises a case 10, a camera unit 20, a storage unit 40, a processing unit 50, a human-machine-interface (HMI) unit 60, an acupoint recognizing unit 70 and an acupoint stimulating unit 80. With reference to FIG. 2, in a second embodiment of the present invention, the handheld system further comprises a wireless transmission unit 30. With reference to FIG. 3, in a third embodiment of the present invention, the handheld system further comprises a tripod head 91, a posture detecting unit 92, and a supplemental lighting lamp L.

The case 10 has an accommodating space S formed in an interior of the case 10. The case 10 has a handle portion 11. The wireless transmission unit 30, the storage unit 40, the processing unit 50, the HMI unit 60, and the acupoint recognizing unit 70 are mounted in the accommodating space S of the case 10. The handle portion 11 is provided for being held by a user.

Figure 6:
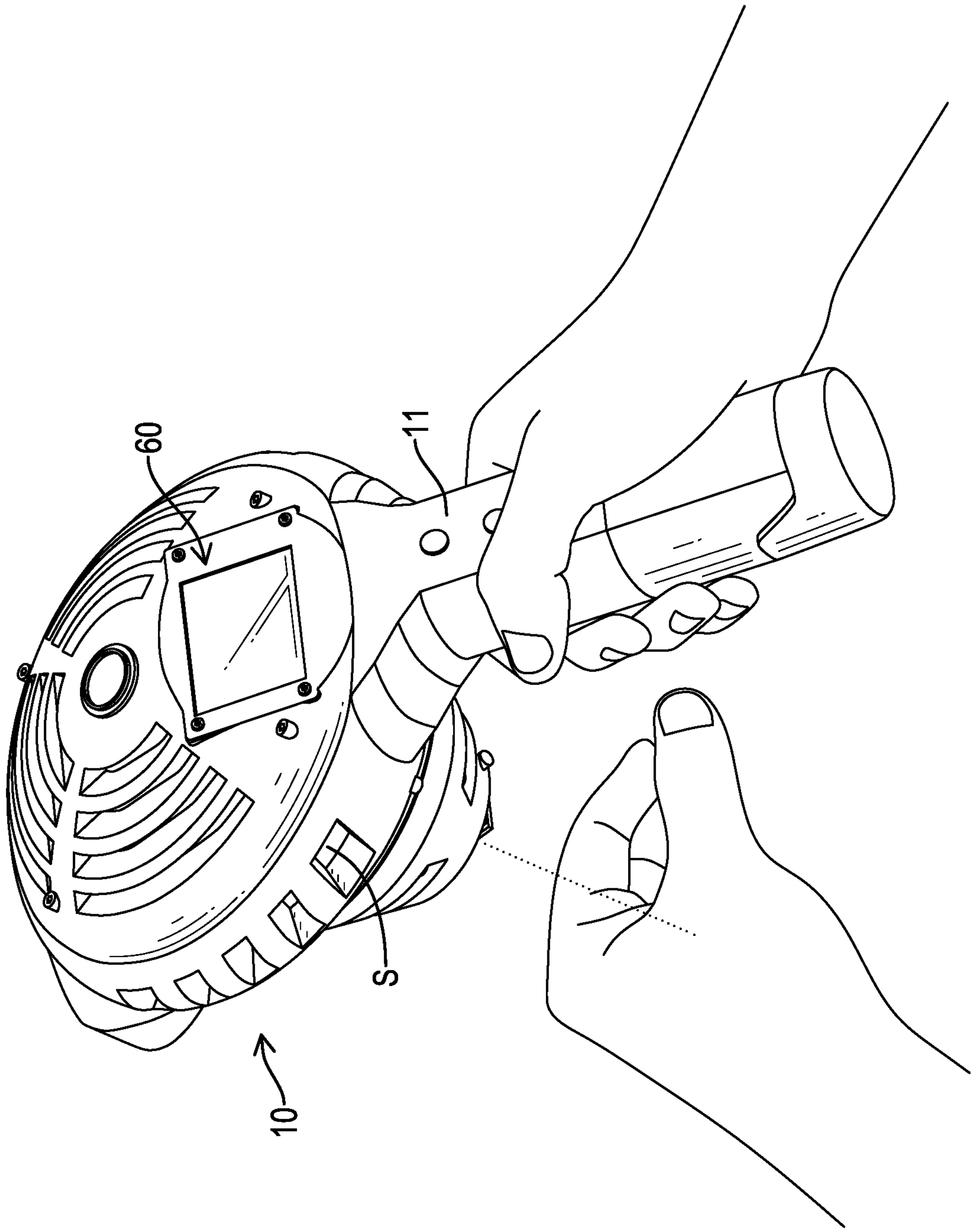
FIG. 6 is a schematic diagram of the positioning unit of the present invention emitting the positioning signal to the acupoint located by the acupoint recognizing unit.

The camera unit 20 may be mounted in the accommodating space S of the case 10, mounted on an exterior of the case 10, or inlaid on the case 10. The camera unit 20 is to capture an image from a body part of a user. Preferably, the camera unit 20 is to capture the image from the user's limbs. As shown in FIG. 6, the user holds the handheld system of the present invention with one hand and capture the image with the other hand. Preferably, the camera unit 20 may be a camera equipped with fisheye lens for a wide-angle view.

The storage unit 40 is electrically connected to the HMI unit 60 and to store multiple predetermined symptom data and multiple predetermined acupoint data. Each one of the multiple predetermined symptom data corresponds to at least one predetermined acupoint datum of the multiple predetermined acupoint data. The multiple predetermined symptom data respectively indicate information of multiple different symptoms stored in the storage unit 40. The multiple predetermined acupoint data respectively indicate the names and the positions of the acupoints of the user. For example, a headache predetermined symptom datum corresponds to an "A" predetermined acupoint datum and a "B" predetermined acupoint datum, which means that when the user has a headache, the "A" acupoint and the "B" acupoint may be adopted to alleviate the symptom.

The processing unit 50 is electrically connected to the camera unit 20 and the wireless transmission unit 30. The processing unit 50 is to receive an input signal. The input signal may be a symptom datum or an acupoint datum. The symptom datum indicates a symptom information of the user. The acupoint datum indicates an acupoint information inputted by the user. Therefore, the present invention is provided for the user to personally input the acupoint information that the user wants to stimulate, or personally input the symptom information for the processing unit 50 to search for the corresponding acupoint information to be stimulated. In the first embodiment of the present invention, the HMI unit 60 is to receive the symptom datum, and the processing unit 50 is to receive the symptom datum from the HMI unit 60. The processing unit 50 compares the symptom datum with the multiple predetermined symptom data stored in the storage unit 40. When the processing unit 50 determines that the symptom datum is consistent with one of the multiple predetermined symptom data, the processing unit 50 obtains the at least one predetermined acupoint datum corresponding to the searched predetermined symptom datum. Or, the HMI unit 60 is to receive the acupoint datum, and the processing unit 50 is to receive the acupoint datum from the HMI unit 60. The processing unit 50 compares the acupoint datum with the multiple predetermined acupoint data stored in the storage unit 40. When the processing unit 50 determines that the acupoint datum is consistent with one of the multiple predetermined acupoint data, the processing unit 50 obtains the at least one predetermined acupoint datum. Preferably, the processing unit 50 may perform an image distortion correction algorithm to correct the image captured by the camera unit 20. By doing so, the failure of image recognition resulting from distortions (such as image warping and aberration) would be avoided.

For the sake of convenience, the symptom datum is deemed as the input signal as an example in the following description. However, it is to be noted that the user may also directly input the acupoint information on demand, such that the handheld system of the present invention may directly receive the acupoint information inputted by the user and accordingly stimulate the acupoint of the user. The present invention is not limited to said example.

The HMI unit 60 is electrically connected to the processing unit 50 and the storage unit 40. The HMI unit 60 may be further electrically connected to the wireless transmission unit 30. The HMI unit 60 is operable by the user. In the first embodiment of the present invention, the HMI unit 60 is to receive the symptom datum and transmit the symptom datum to the processing unit 50. For example, the HMI unit 60 may receive or detect the user's voice, touch, and/or clicking signals for providing a voice control function or touch control function. Specifically, the HMI interface 60 may receive and obtain the symptom datum orally inputted by the user's speaking. Or, the HMI interface 60 may display a list including options of the multiple predetermined symptom data, such that the user may manually touch or click one of the options for designating one of the multiple predetermined symptom data as the symptom datum inputted by the user.

Compared with the first embodiment of the present invention, with reference to FIG. 2, the second embodiment of the present invention further comprises the wireless transmission unit 30. The wireless transmission unit 30 is electrically connected to the HMI unit 60. The wireless transmission unit 30 is to receive the symptom datum. The symptom datum may be transmitted by a mobile device M. The mobile device M may be a smart phone or a tablet. Specifically, the user may input the user's symptom information into the mobile device M, such that the mobile device M accordingly transmits the symptom datum to the handheld system of the present invention, and the symptom datum will be received by the wireless transmission unit 30. For example, the wireless transmission unit 30 may be Bluetooth 4.0 or any other wireless transmission unit, such as Wi-Fi, ZigBee, wireless network, and so on.

The acupoint recognizing unit 70 is electrically connected to the processing unit 50 to receive the at least one predetermined acupoint datum and recognize and locate the position of the acupoint according to the at least one predetermined acupoint datum. In the present invention, the acupoint recognizing unit 70 receives the image captured by the camera unit 20 and recognizes the acupoint positions of the user's body part in said image. In practice, the acupoint recognizing unit 70 may perform a human skeleton recognition technique (such as OpenPose, ResNet, and so on) to locate the acupoint positions. In the embodiment of the present invention, the acupoint recognizing unit 70 may detect a finger width of the thumb, a distance between a fingertip and a second knuckle of the index finger, or a distance between a fingertip and a second knuckle of the ring finger as a reference length for determining the acupoint position. Besides, the acupoint recognizing unit 70 may detect a center of the palm or a first wrist rasceta nearest the palm as a beginning basis. According to the reference length and the beginning basis, the acupoint recognizing unit 70 may estimate the positions of the acupoints for people of different heights and body builds. For example, the acupoint recognizing unit 70 may have a predetermined number of at least one or multiple reference lengths consecutively connected, wherein a first reference length has a beginning on the beginning basis, and a last reference length has a terminal indicating the position of a specific acupoint of the user. Different acupoints would respectively correspond to different predetermined numbers of the reference lengths. In order words, the acupoint recognizing unit 70 adds the at least one or multiple reference lengths from the beginning basis. For example, there would be a specific acupoint located at two consecutively-connected reference lengths (the predetermined number is two) from the center of the palm. Hence, for the users of different heights and body builds, said distance and said width of each user's body part may be deemed as a standard for estimating positions of the user's acupoints, thereby accurately locating the positions of the user's acupoints.

The acupoint stimulating unit 80 is electrically connected to the acupoint recognizing unit 70 to stimulate the acupoint of the user located by the acupoint recognizing unit 70. Specifically, the acupoint stimulating unit 80 may be an auto-acupuncturing device to automatically prod the user's acupoint. Or, the acupoint stimulating unit 80 may be a massage gun to continuously pressure the user's acupoint. Or, the acupoint stimulating unit 80 may be a current massager to output a micro-current to stimulate the user's acupoint, wherein the micro-current approximates to the bioelectricity of the human body. The acupoint stimulating unit 80 is not limited to the auto-acupuncturing device, the massage gun, and the current massager. Any device that can massage or stimulate the user's acupoint should be within the technical scope of the present invention. In addition, the acupoint stimulating unit 80 may be a moxibustion stick. Moxa candles and fire-lighting device or heating device may be mounted in the moxibustion stick. The moxibustion stick may be abutted on the user's acupoint located by the acupoint recognizing unit 70. Thus, the moxibustion stick provides high temperature by heating the wormwood pellets to stimulate the user's acupoint.

Compared with the first embodiment and the second embodiment of the present invention, with reference to FIG. 3, the third embodiment of the present invention further comprises the tripod head 91, the posture detecting unit 92, and the supplemental lighting lamp L. The tripod head 91 is an electric tripod head to be electrically connected to the acupoint recognizing unit 70 and the acupoint stimulating unit 80 to control an orientation of the acupoint stimulating unit 80 toward the user's acupoint located by the acupoint recognizing unit 70. The posture detecting unit 92 is electrically connected to the tripod head 91 and mounted on the tripod head 91. The posture detecting unit 92 is to detect a position, orientation angles, and a rotating speed of the tripod head 91 in the space and accordingly generate a rotating signal according to the position, the orientation angles, and the rotating speed of the tripod head 91. The tripod head 91 receives the rotating signal and adjusts the orientation of the acupoint stimulating unit 80 according to the rotating signal toward the user's acupoint located by the acupoint recognizing unit 70. Specifically, the posture detecting unit 92 may include an e-compass sensor, an accelerometer, a G-sensor, an optical encoder, a potentiometer, a rotational variable difference transformer, and a gyroscope sensor.

The supplemental lighting lamp L is electrically connected to the processing unit 50. The supplemental lighting lamp L is turned on to provide brightness as a supplemental illumination when the acupoint stimulating unit 80 is working (stimulating). The supplemental lighting lamp L may be a ring light (shaped as an angel ring) having light emitting diodes (LEDs).

With reference to FIG. 3 and FIG. 6, the handheld system of the present invention may further comprise a positioning unit 93. The positioning unit 93 is electrically connected to the tripod head 91 and mounted on the tripod head 91. The positioning unit 93 is to emit a positioning signal to the acupoint located by the acupoint recognizing unit 70. By doing so, no matter whether the handheld system of the present invention is moved or shifted, the tripod head 91 may adaptively rotate, such that the positioning signal is retained to be emitted to said acupoint located by the acupoint recognizing unit 70. Specifically, the positioning unit 93 may be a laser positioning device or an infrared positioning device. Taking the laser positioning device as an example, the laser positioning device may emit a laser beam as the positioning signal to the acupoint located by the acupoint recognizing unit 70. By doing so, when the handheld system of the present invention is moved or shifted, the acupoint stimulating unit 80 is prevented from stimulating other positions of the user's body part rather than said acupoint.

Figure 4:
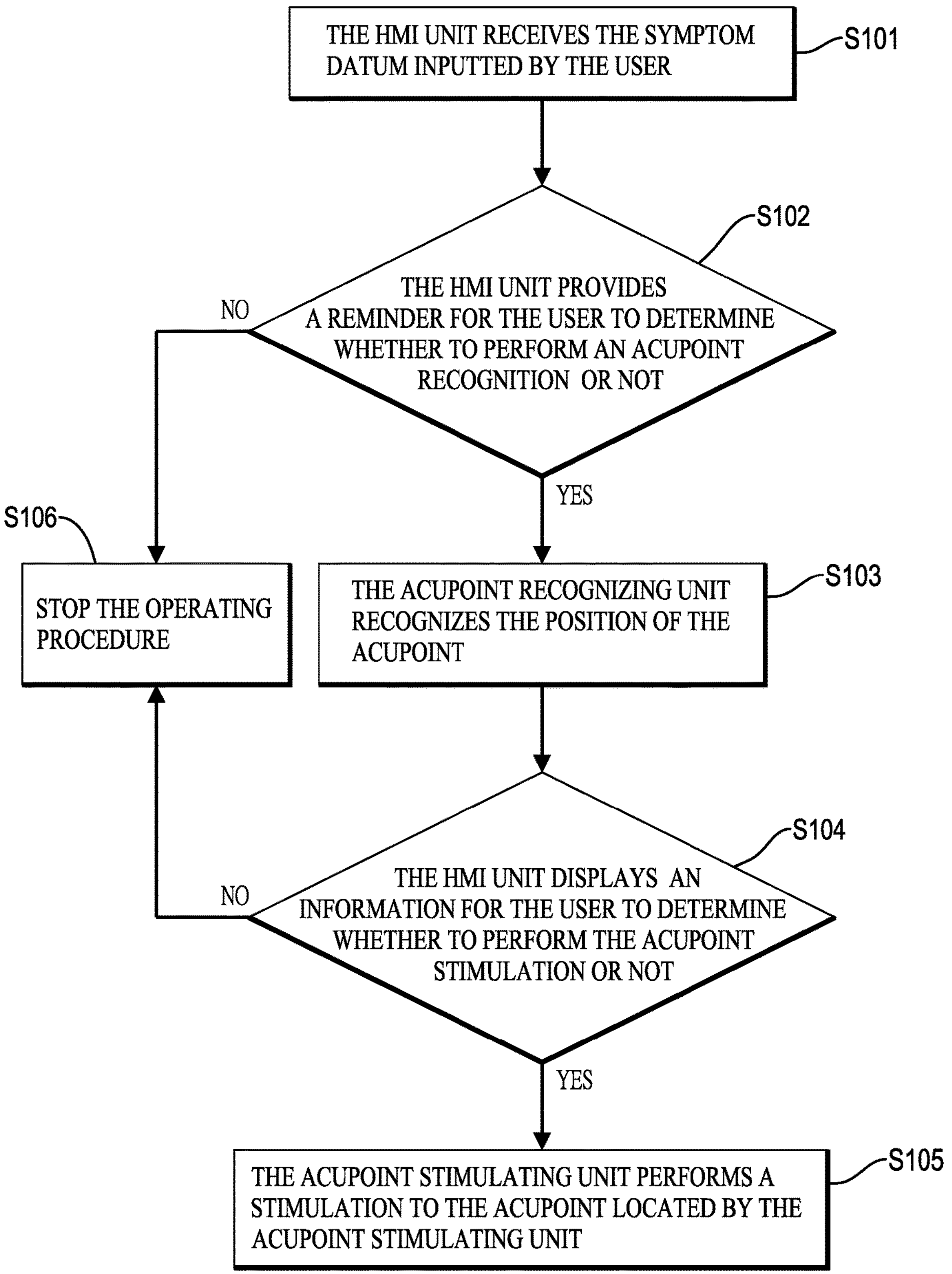
FIG. 4 is a flow chart of the operating procedure of the present invention.

With reference to FIG. 4, an operating procedure of the handheld system of the present invention is described as follows.

Step S101: The HMI unit 60 receives the symptom datum inputted by the user.

Step S102: The HMI unit 60 provides a reminder for the user to determine whether to perform an acupoint recognition or not. In this step, the HMI unit 60 may display a dialog box as the reminder. When the user chooses a "Yes" option of the dialog box, the operating procedure of the present invention enters Step S103. When the user chooses a "No" option of the dialog box, the operating procedure of the present invention enters Step S106 to stop the operating procedure.

Step S103: The processing unit 50 commands the acupoint recognizing unit 70 to recognize the position of the acupoint. When the acupoint recognizing unit 70 finishes such acupoint recognition, the user may move or shift the handheld system of the present invention above the acupoint located by the acupoint recognizing unit 70. At the same time, the positioning unit 93 may emit the positioning signal on said acupoint.

Step S104: The HMI unit 60 displays an information for the user to determine whether to perform the acupoint stimulation or not. The HMI unit 60 may provide another reminder reciting or depicting that the acupoint recognition has been finished and displaying options for the user to determine whether to proceed with the acupoint stimulation or not. When the user chooses a "Yes" option, the operating procedure of the present invention enters Step S105. When the user chooses a "No" option, the operating procedure of the present invention enters the Step S106 to stop the operating procedure.

Figure 7:
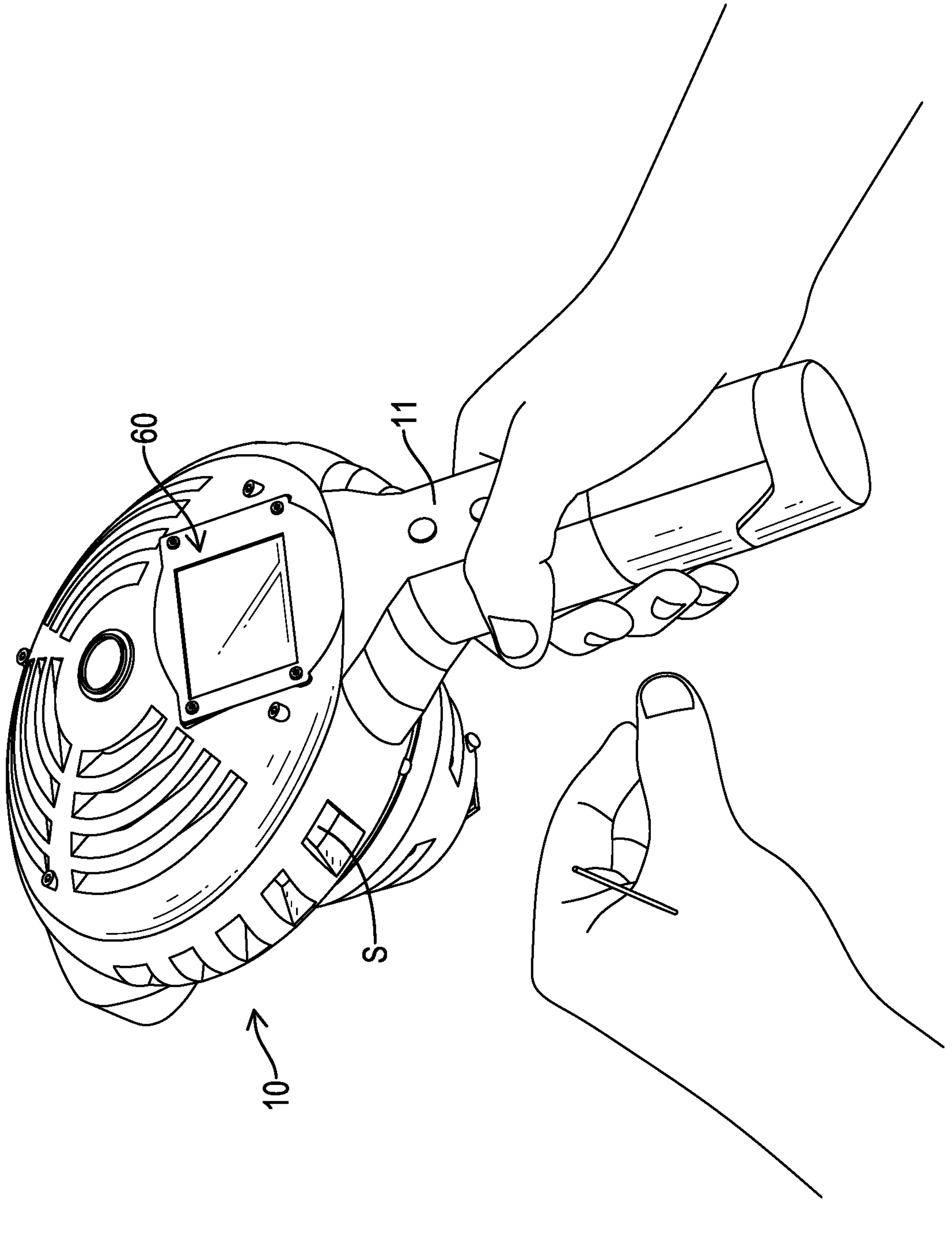
FIG. 7 is a schematic diagram of the acupoint stimulating unit of the present invention performing the stimulation to the acupoint.

S105: The acupoint stimulating unit 80 performs a stimulation to the acupoint located by the acupoint stimulating unit 80. For example, the acupuncture, massage gun, or current massager as mentioned above may perform the stimulation to the acupoint located by the acupoint stimulating unit 80. FIG. 7 is an example depicting an acupuncture needle of the acupoint stimulating unit 80 inserted into the user's acupoint located by the acupoint stimulating unit 80.

The handheld system of the present invention may receive the symptom information inputted by the user and search for the acupoints that can alleviate the symptom, or receive the acupoint information inputted by the user. Then, the handheld system of the present invention may locate an accurate position of said acupoints on the user's body, thereby stimulating, performing the electrotherapy or the massaging to said acupoints of the user. The user may hold the handheld system of the present invention and read a guidance provided by the HMI unit 60. The guidance may teach the user how to operate the handheld system of the present invention to stimulate the acupoints by himself/herself. The user does not have to rely on a professional person skilled in the acupuncture treatment to use the handheld system of the present invention. The user may operate the handheld system of the present invention by himself/herself. The convenience to perform the acupuncture treatment by using the handheld system of the present invention is increased. The effort to travel to and from the hospital and the clinic should be decreased for the elderly people or the people with disabilities. The ideal of the home health care is further implemented. For the purpose of harmonizing the human body's meridians and increasing the diversity of the selection of the acupoints, the acupoint stimulating unit 80 of the present invention not only automatically inserts the acupuncture needles into the user's acupoints, but also provides options including the massage gun to press the user's acupoints and the current massager to stimulate the user's acupoint by currents.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A handheld system of automatic acupoint stimulation, comprising:

a case having:

an accommodating space formed in an interior of the case; and a handle portion;

a camera unit mounted in the accommodating space of the case to capture an image from a body part of a user;

a storage unit mounted in the accommodating space of the case to store multiple predetermined acupoint data;

a human-machine-interface (HMI) unit mounted in the accommodating space of the case, electrically connected to the storage unit, and to receive an input signal;

a processing unit mounted in the accommodating space of the case, electrically connected to the camera unit and the HMI unit, receiving the input signal transmitted by the HMI unit, and searching for at least one predetermined acupoint datum that is corresponding to the input signal from multiple predetermined acupoint data;

an acupoint recognizing unit mounted in the accommodating space of the case and electrically connected to the processing unit to receive the at least one predetermined acupoint datum and obtain a reference length and a beginning basis according to the image captured by the camera unit, wherein the acupoint recognizing unit adds at least one or multiple said reference lengths from the beginning basis to recognize and locate a position of an acupoint of the user;

an acupoint stimulating unit mounted in the accommodating space of the case and electrically connected to the acupoint recognizing unit to stimulate the acupoint of the user located by the acupoint recognizing unit; and a tripod head electrically connected to the acupoint recognizing unit and the acupoint stimulating unit to control an orientation of the acupoint stimulating unit toward the acupoint of the user located by the acupoint recognizing unit.

2. The handheld system as claimed in claim 1, further comprising a posture detecting unit mounted on the tripod head and connected to the tripod head to detect a position, orientation angles, and a rotating speed of the tripod head and generate a rotating signal, wherein the tripod head adjusts the orientation of the acupoint stimulating unit according to the rotating signal.

3. The handheld system as claimed in claim 2 further comprising a positioning unit electrically connected to the tripod head and mounted on the tripod head to emit a positioning signal to the acupoint located by the acupoint recognizing unit.

4. The handheld system as claimed in claim 1 further comprising a wireless transmission unit electrically connected to the HMI unit to receive the input signal transmitted by a mobile device.

5. The handheld system as claimed in claim 4, further comprising a posture detecting unit mounted on the tripod head and connected to the tripod head to detect a position, orientation angles, and a rotating speed of the tripod head and generate a rotating signal, wherein the tripod head adjusts the orientation of the acupoint stimulating unit according to the rotating signal.

6. The handheld system as claimed in claim 5 further comprising a positioning unit electrically connected to the tripod head and mounted on the tripod head to emit a positioning signal to the acupoint located by the acupoint recognizing unit.

7. The handheld system as claimed in claim 1, further comprising a positioning unit electrically connected to the tripod head and mounted on the tripod head to emit a positioning signal to the acupoint located by the acupoint recognizing unit.

8. The handheld system as claimed in claim 1, wherein the input signal includes an acupoint datum indicating an acupoint information inputted by the user.

9. The handheld system as claimed in claim 1, wherein the input signal includes a symptom datum of the user;

the storage unit stores multiple predetermined symptom data;

each one of the multiple predetermined symptom data corresponds to at least one predetermined acupoint datum of the multiple predetermined acupoint data.

10. The handheld system as claimed in claim 1 further comprising a supplemental lighting lamp electrically connected to the processing unit to provide brightness.

11. The handheld system as claimed in claim 1, wherein the acupoint stimulating unit is an auto-acupuncturing device.

12. The handheld system as claimed in claim 1, wherein the acupoint stimulating unit is a current massager.

13. The handheld system as claimed in claim 1, wherein the acupoint stimulating unit is a massage gun.

14. The handheld system as claimed in claim 1, wherein the acupoint stimulating unit is a moxibustion stick.

* * * * *